(12) United States Patent
Keller et al.

(10) Patent No.: US 7,996,553 B2
(45) Date of Patent: Aug. 9, 2011

(54) MULTI-USER STREAMING

(75) Inventors: Ralf Keller, Würselen (DE); Thorsten Lohmar, Aachen (DE); Frank Hundscheidt, Kerkrade (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 818 days.

(21) Appl. No.: 10/595,473

(22) PCT Filed: Oct. 23, 2003

(86) PCT No.: PCT/EP03/11720
§ 371 (c)(1),
(2), (4) Date: Oct. 27, 2006

(87) PCT Pub. No.: WO2005/041479
PCT Pub. Date: May 6, 2005

(65) Prior Publication Data
US 2007/0058626 A1 Mar. 15, 2007

(51) Int. Cl.
*G06F 13/00* (2006.01)
(52) U.S. Cl. ........ 709/232; 709/231; 709/230; 709/203; 725/101

(58) Field of Classification Search .................. 370/252; 725/101, 103, 104; 709/203, 230, 231, 232, 709/236
See application file for complete search history.

(56) References Cited

U.S. PATENT DOCUMENTS

| | | | |
|---|---|---|---|
| 6,014,706 A * | 1/2000 | Cannon et al. | 709/231 |
| 6,359,902 B1 * | 3/2002 | Putzolu | 370/466 |
| 6,798,751 B1 * | 9/2004 | Voit et al. | 370/252 |
| 7,310,730 B1 * | 12/2007 | Champagne et al. | 713/163 |
| 7,734,762 B2 * | 6/2010 | Hundscheidt et al. | 709/224 |
| 2001/0029525 A1 | 10/2001 | Lahr | |
| 2006/0069799 A1 * | 3/2006 | Hundscheidt et al. | 709/232 |

FOREIGN PATENT DOCUMENTS
WO   WO 03 019861 A   3/2003
* cited by examiner

*Primary Examiner* — Kenneth R Coulter (57) ABSTRACT

The invention provides a solution for performing multicast for streaming transmission in a telecommunication system. An intermediate node is proposed which is able to connect the functionality of a broadcast/multicast server and of a streaming node. Further the intermediate node is responsible for the establishment of a bearer for multicast transmission. The establishment of a session is done by means of a translation the on-demand single-use signalling into multi-user push signalling. Furthermore an adaptation of the streaming flow for a whole multicast group or for individual subgroups of a multicast group is performed.

16 Claims, 4 Drawing Sheets

MULTI-USER STREAMING

TECHNICAL FIELD OF THE INVENTION

The present invention relates to a method, a system and an intermediate node for providing multiuser streaming in a telecommunication system.

Especially the present application is applicable in a wireless packet-switched telecommunication network.

BACKGROUND

Universal Mobile Telecommunication System UMTS is being developed to offer wireless wideband multimedia services. However streaming is also applicable to GSM, even though with a lower bandwidth. Images, voice, audio and video content are examples of mobile multimedia services, which are delivered to clients via media streaming and download techniques. It means once the content has been put onto a media server, it can be delivered on-demand via download or streaming. To download content, the user clicks for example on a link and waits for the content to be downloaded and playback to begin. Content streaming is done towards a single user by means of a unicast connection, when the user has requested this. The unicast connection is also called point-to-point communication.

Multicast is a service that permits sources to send a single copy of the same data to an address that causes the data to be delivered to multiple recipients. With multicast only a single copy of a data item passes over any link in a network and copies of the data item are made only where paths diverge. From the network perspective, multicast dramatically reduces overall bandwidth consumption, since the data is replicated in the network at appropriate points rather than in the end-systems. Furthermore, a server that uses multicast to distribute the content to multiple receivers, must manage only one session.

Local area networks have supported multicasting for many years. For networks, where nodes share a common communication medium multicasting is easy to support. A specially addressed packet can be read off the communication medium by multiple hosts.

Multicasting in the internetworking between a fixed network, like for example the Internet or any other IP-based backbone network and a mobile network like, General Packet Radio System GPRS or Universal Mobile Telecommunication System UMTS is currently developed, because especially in the wireless network new challenges occur. These challenges are for example the mobility of the end users and low transmission bandwidth of the mobile network on the air interface, but also the lower reliability due to the packet loss on the radio interface compared to the fixed networks.

Figure 1:
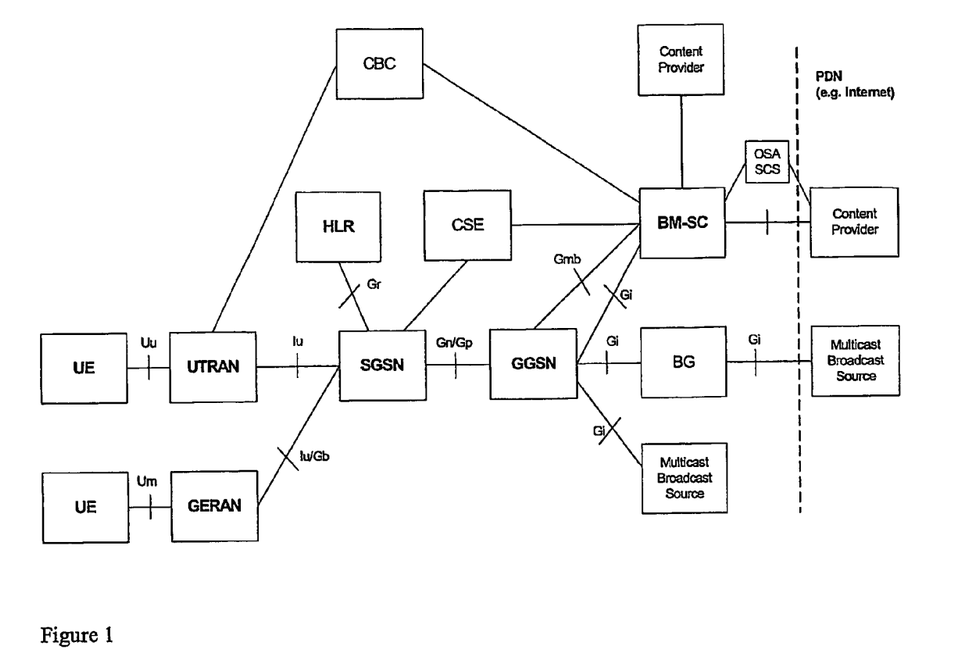
FIG. 1: Multimedia Broadcast/Multicast Service architecture.

The currently discussed multicast/broadcast integration into UMTS and GSM is depicted in FIG. 1, which shows the architecture of multimedia broadcast/multicast. In FIG. 1 the most relevant nodes of GPRS or UMTS network and examples of the different access networks, like UTRAN and GERAN, are presented. The access networks are handled by means of a serving node, SGSN that communicates with an edge node, the GGSN that is responsible for connection to the external networks, like Internet. The BM-SC entity is responsible for the provision of multicast/broadcast, like for example for bearer establishment and data forwarding. However there is currently no solution existing, which works for multicasting of streaming. Since the idea is that the current BM-SC proposals simply forward the content. The functionality for handling a streaming flow is not included in the BM-SC.

Currently the signalling and transmission of the streaming flow for a single user is performed in a wireless network by means of a Packet Switched Streaming architecture, which has a streaming server distributing the streaming flow to a streaming node, which can be realised by means of network integration nodes NINs. There are also solution, in which a content servers distributes the streaming content directly to the streaming clients on the user's side. These content servers are either the streaming servers or the NINs. The streaming nodes communicate with the GGSN that forwards the stream to the SGSN and then via the radio network to a user.

Simply aggregating both solutions would lead to a system in which a streaming session is established for every user interested in receiving the streaming flow, implying that such a service will be very inefficiently deployed, especially in wireless networks, since it does not utilize the scarce radio resources in an optimal way. Furthermore although the transport may be multicast, a separate streaming session would be established per client with dedicated on-demand signalling messages. Further the adaptation will be done for the whole group and not on a per subgroup base, implying that the adaptation is general and not optimized for the different subgroups. Currently an individual adaptation can be achieved because all users have a separate and dedicated streaming session, wherein this solution leads to wasting of network resources.

Therefore currently there is no integration between the multicast and the unicast streaming transmission, providing an efficient and effective solution.

SUMMARY AND DESCRIPTION OF THE INVENTION

It is an object of the present invention to provide an efficient solution for providing multicast for streaming transmission within a telecommunication network.

The method of the basic idea for providing multicast for streaming transmission from a streaming server to a multicast group is disclosed in claim 1. The streaming server providing the streaming content can be located within the mobile network or in an external network. A multicast/broadcast server is responsible for providing multicast transmission. The task of said server is for example administration of the established multicast group, forwarding of the multicast data. A streaming node supports a streaming transmission. The streaming node is currently responsible for establishing a connection to a single user by means of an on-demand single-user signalling and optionally for an adaptation of the received streaming flow to the conditions of the network connection for the user. Further the streaming node can take care of the billing and charging procedure for the streaming receivers. On the basis of the known functionality the present invention proposes to integrate logically or/and physically the streaming node and the multicast/broadcast server building an intermediate node and to add the following functionality.

The intermediate node receives a message initiating an establishment of a multicast bearer according to the requirements for streaming transmission. The intermediate node establishes a session on the multicast bearer by translating the on-demand single-user signalling received from the streaming server into multi-user push signalling being sent to the group members. An important advantage of the multi-user push signalling is the achievement of the synchronisation of the multicast group members. The intermediate node has the functionality of adapting the received streaming flow to the multicast transmission according to the needs of a multicast group or a subgroup. Further the intermediate node replicates the received streaming transmission according the number of the multicast subgroups.

In the following the term intermediate node describes a logical or a physical combination of the streaming node and of the multicast/broadcast server for the purpose of the present invention.

There are different ways of ordering the broadcast/multicast server and the streaming node within the intermediate node.

In one embodiment of the invention the streaming node communicating with the server adapts the streaming transmission and forwards the adapted streaming transmission to the multicast/broadcast server, which replicates the received streaming transmission among the subgroups of a multicast group. The advantage of this solution is that the streaming node performs an adaptation for the whole group or a subgroup, it means before the replication is done in the multicast/broadcast server.

In a further embodiment the multicast/broadcast server communicating with the server replicates the received streaming transmission among the subgroups of a multicast group and forwards each replicated streaming transmission to the streaming node, which adapts each streaming transmission. The smallest subgroup consists of one user. The advantage of this solution is that the streaming node is able to do a dedicated adaptation for specific subgroups with the same characteristics, like for example all users served by the same SGSN or all users receiving the service in the same access network, for example GSM or WCDMA. Furthermore, the multicast/broadcast server may select different streaming nodes for the different replications of a stream, like for example for load balancing reasons or because the streaming nodes have different capabilities.

In a further embodiment the intermediate node has a decision unit for deciding whether the received streaming flow is to be directed first to the multicast/broadcast server or to the streaming node. It means the deciding unit decides either to direct the streaming flow to the multicast/broadcast server and then to the streaming node or it directs it to the streaming node and then to the multicast/broadcast server. The flow can also be directed only to the multicast/broadcast server. It can be also decided that no replication in the multicast/broadcast server is needed, because for example all users are in the same cell. The decision can also be that the involvement of a multicast/broadcast server or a streaming node is not required at all.

In a preferred embodiment of the present invention there are different streaming nodes being identified by means of addresses and the streaming nodes may differ regarding different capabilities. The multicast/broadcast server knows the addresses and the different capabilities and said multicast/broadcast server has the capability to select an appropriate streaming node for performing an appropriate adaptation of the streaming flow.

In an embodiment of the present invention, in which a hierarchical coding is used, the streaming flows are differentiated in the sense that a different number of layers are sent to different streaming nodes. In the hierarchical coding there is the base layer being sent to every user and additionally there are enhancement layers on top that can for example increase frame rate or spatial resolution for users requesting it. The multicast groups can be distinguished regarding the number of levels being able and/or willing to receive.

In a preferred embodiment of the present invention the intermediate node handles the received address(es) identifying the receiver(s) of the streaming flow. It may be required to perform a translation of a unicast address into a multicast address. The unicast address can be included in an on-demand single-user signalling received from the server. It is also possible that the received address from the server is a multicast address, implying that the translation between two different multicast addresses may be needed. This case occurs, when the broadcast/multicast server is part of a multicast group receiving content from the server, because the operator has several broadcast/multicast servers and the distribution of the content to all broadcast/multicast servers is done by means of multicast. Therefore the external multicast address received from the server is translated into the internal multicast address used on the interface towards the users. It is also possible that the handling requires only forwarding to the appropriate multicast group, because the same multicast address is used between the server and the intermediate node and between the intermediate node and the multicast groups. It is advantageous to have different possibilities to inform the multicast/broadcast server about the streaming node, for example this can be event-based messages sent from an operator to the multicast/broadcast server and to the streaming node on which reaction the multicast/broadcast server sends a request message to the sender and receives an acknowledgement message with all the relevant parameters. In a further embodiment the operator administrates this information or the multicast/broadcast server may regularly request the information from the streaming servers.

In a preferred embodiment of the present invention the intermediate node receives a session description message like for example Session Description Protocol SDP inside of a Real Time Steaming Protocol RTSP message from the server informing about the transmission parameters required for the streaming session. The intermediate node can decide by receiving the session description message which streaming node can be taken in order to fulfil the requirements for the streaming session. This session description info is forwarded to the group members by means of the multi-user push signalling message, like for example SDP inside of a Session Initiation Protocol SIP or Session Adaptation Protocol SAP message.

Further it is proposed that the intermediate node by receipt of a session description message informing about the transmission parameters required for the streaming session changes the received parameters according to the needs of the subgroups and sends the changed parameters to the group members by means of the multi-user push signalling message. The advantage of this solution is that a dedicated adaptation according to the users requirements can be performed.

For the realisation of the dedicated adaptation nodes higher up in the hierarchy are informed that the streaming flow is only to be forwarded to a single node lower in the hierarchy. It means in case of a dedicated adaptation for an SGSN-area as an example nodes like, the GGSN, BM-SC and NIN must be informed that the streaming flow is only to be sent to that specific SGSN. As mentioned before the decision of dedicated adaptations is taken in the intermediate node. A new message is then to be distributed along the multicast delivery tree, indicating the streaming flow and the destination, for example a certain SGSN. All nodes in-between will set the distribution tree information accordingly for that specific stream.

Further it is proposed that the conversion between single-user on-demand and multi-user push signalling implies that certain messages are not propagated. In a preferred embodiment it is not required that all the users send an answer about the acceptance of the parameters, when they registered to a group advertising certain parameters and thus already indicated that they are willing and able to receive the content with these conditions.

In a preferred embodiment of the present invention the replication of the streaming flow is based on an access network, in which users are located or/and is based on the geographic area and/or on the Quality of Service requested by the group members. The advantage of this solution is the definition of different subgroups within a multicast group so that the subgrouping can better satisfy the users requirements, for example considering their current access network characteristics and status.

It is proposes that in order the intermediate node is aware of the available QoS in the corresponding area, the intermediate requests the actual characteristics of the area in order to adapt the streaming flow accordingly. This implies for example that the intermediate node is provided with the addresses of the corresponding subarea or access nodes, such as the SGSN or the RNC. From these nodes the intermediate node can then request the actual characteristics of the subarea.

Since the intermediate node administrates all the multicast traffic sent to the group members, including the dedicated (sub-) group adaptations, it can provide more accurate charging, and in a further preferred embodiment the intermediate node provides additional information to the charging/billing server in order to be able to do an accurate charging and/or multi-user streaming related charging. The information provided to the charging/billing server is the number of group members, the reception quality, which is received in the feedback from the group members, according to which an adaptation may be done, the streaming flow characteristics, the number of group members per adapted/replicated streaming flow, etc.

Further it is proposed to have an intermediate node being adapted to provide multicast for streaming transmission from a streaming server to users of a multicast group with a multicast/broadcast server providing multicast transmission and with a streaming node providing a streaming transmission and based on an on-demand single-user signalling supporting the transmission of a streaming flow. Said intermediate node includes the multicast/broadcast server and the streaming node with the following additionally functionality. Bearer establishing means for establishing a bearer for a multicast transmission according to the requirements for streaming transmission received from the server. Further there is session establishing means for establishing a multi-user streaming session on the bearer by translating the on-demand single-user signalling received from the streaming server into multi-user push signalling. The adaptation means is responsible for adapting the received streaming flow to the multicast transmission according to the needs of a multicast group. The replication means is responsible for the replication of the streaming flow among the subgroups.

Further a system being adapted to provide multicast for streaming transmission from a streaming server to users of a multicast group with a multicast/broadcast server providing multicast transmission and with a streaming node providing a streaming transmission and with an on-demand single-user signalling supporting the transmission of a streaming flow, wherein said system has an intermediate node according to claim 15 and the method according to claim 1 is performed within the system.

In the following a detailed description of the invention is given.

Figure 2:
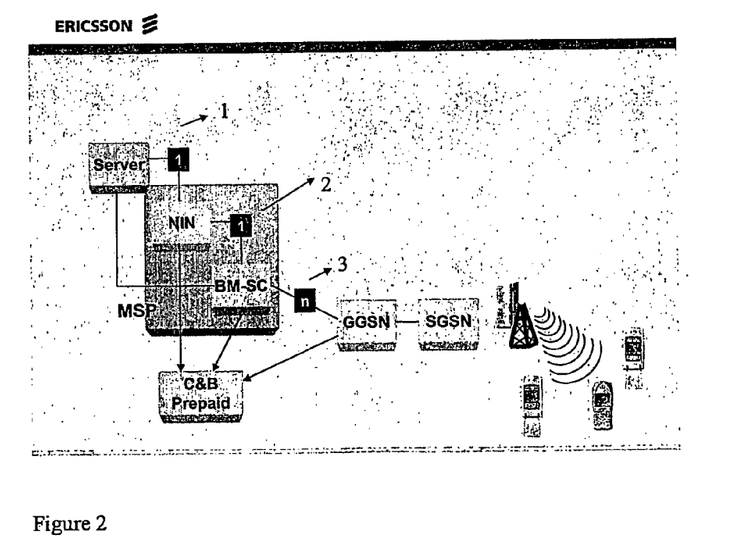
FIG. 2: Embodiment of the present invention with NIN located between a server and a BM-SC.

The description of the possible technical realisation of the present invention is based on the network architectures according to FIGS. 1 and 2. Therefore in the following description the broadcast/multicast server will be called BM-SC. The Network Integration Node NIN is an example of a streaming node supporting streaming protocols like for example RTSP, RTP, RTCP. However in the following an example is given with the architecture having the NIN, this should not be seen as a restriction for the present invention.

In the following the different possibilities of the direction of the streaming flow within the intermediate node, which can be called Multicast Streaming Proxy MSP regarding the order of adaptation and replication are described in more details.

In one embodiment the BM-SC is integrated between the NIN and the GGSN as depicted in FIG. 2. FIG. 2 shows a server sending the streaming flow to the intermediate node. Within the intermediate node the NIN is the first node that is contacted. Said NIN communicates on the other hand with the BM-SC. The numbers on the arrows indicate the number of flows that are to be sent on said link. Thus at first an adaptation of the received stream in the NIN is performed, 10, and then the stream is sent to the BM-SC, 20, being responsible for the replication, n, indicating the replication of the stream for n subgroups. The stream(s) is/are sent to the GGSN and respectively to the SGSN. Additionally a communication with the so-called C&B Prepaid node takes place regarding the forwarding of charging and billing related data. The benefit of this solution is that the NIN does a general adaptation for the whole group before the replication is performed in the BM-SC.

Figure 3:
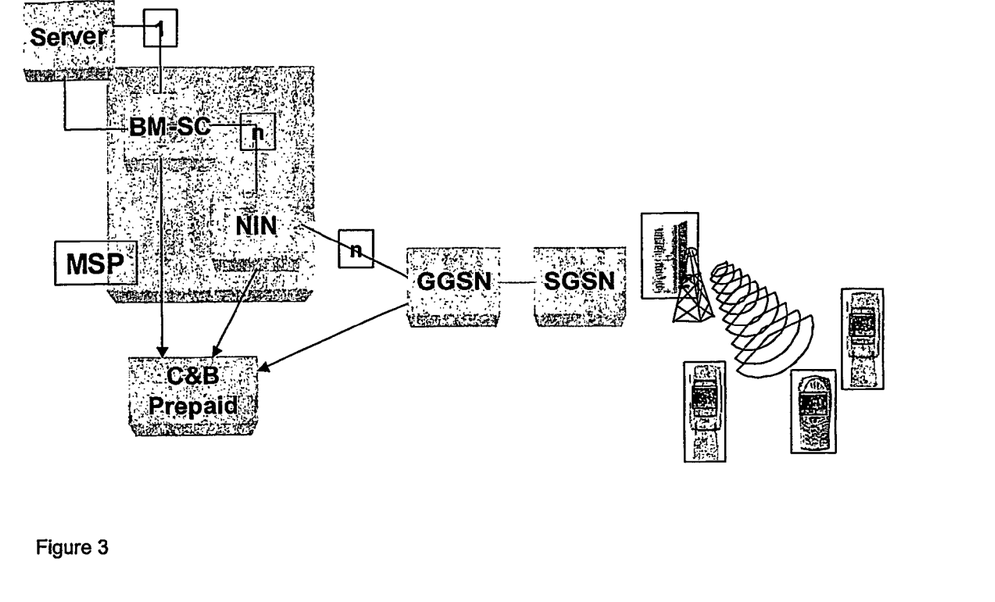
FIG. 3: Embodiment of the present invention with a BM-SC located between a server and a NIN.

In another embodiment the BM-SC is integrated between the streaming server and the NIN, as reflected in FIG. 3, in which the server sends a streaming flow to the BM-SC being responsible for the replication. The replicated streams are forwarded to the NIN or NINs, which perform(s) the adaptation. Respectively the n streams are distributed to subgroups passing GGSN and SGSNs. The benefit of this solution is that the NIN provides a dedicated adaptation for specific subgroups with the same characteristics, like for example all members served by the same SGSN or residing in the same access network. Furthermore, the BM-SC may select different NINs for the different replicated streams.

In the third embodiment of the present invention in order to increase the flexibility a decision is taken, over which path the received streaming flow within the intermediate node is to be directed. The path is determined by means of configuration, depending on the group or other criteria. The issue here is that different paths are possible, even simultaneously and that certain criteria are used to establish and maintain the most appropriate path. This solution is reflected in FIG. 4. A logical unit, called Path Determination Logic (PDL), determines the optimal path of the streams and the corresponding signalling messages. In the FIG. 4 the logical PDL is co-located with the BM-SC. In general the PDL may be a standalone entity or it may be co-located with any other network entity as long as the corresponding interfaces to the other network entities exist.

Figure 4:
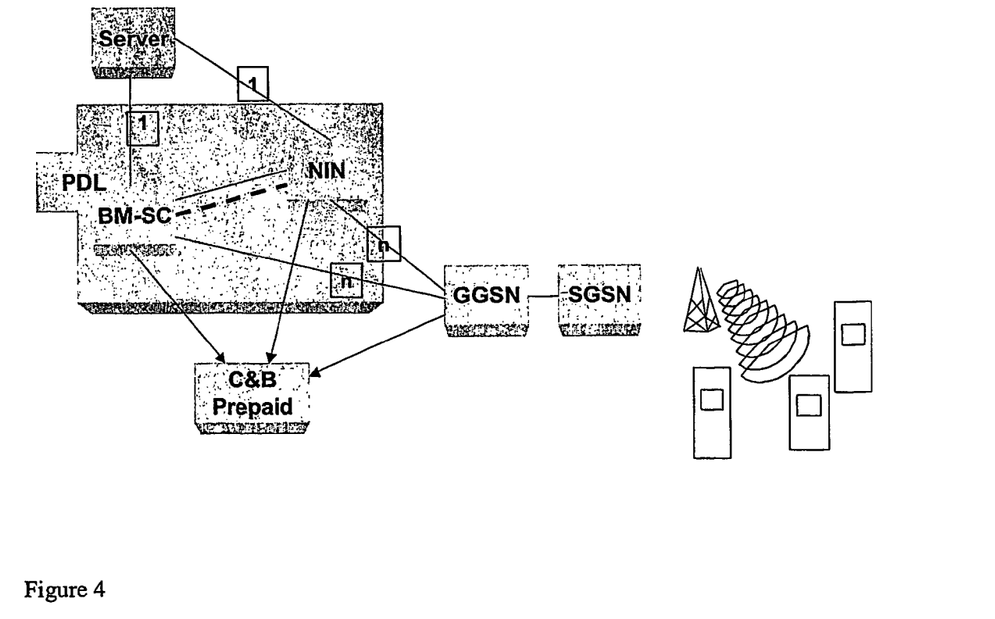
FIG. 4: Embodiment of the present invention with a decision unit.

The PDL selects and creates a path via the intermediate node. The selection criteria depend on the benefit, which is to be achieved, it means it is required to adapt the streaming flow for the whole group or the requirement is to adapt individual streams dedicated to different subgroups. The benefits are discussed above. The selection can be applied on a per content or content provider base. Input for the selection is given by the operator for example by means of a corresponding management interface or by the content server or by the BM-SC, which has the advantage that the selection is group driven.

In the following some examples of selection scenarios are discussed. In case a service is offered where one quality level has to fit all wishes. For example due to a reduced tariff a common stream adaptation in the NIN might be sufficient. In contrary in case a service quality is to be achieved the content is to be first replicated in the BM-SC and then a dedicated adaptation per SGSN, RNC or even per cell is to be performed.

When the intermediate node determines certain parameters for a subgroup then said parameters are to be sent to the subgroup. They confirm the possibility for receiving a streaming flow with these parameters, unless the signalling is changed to push signalling in which case the network does not expect or require a confirmation from the group members. It is also possible that a subgroup sends at session establishment a request for expected quality and then the intermediate node has to select the appropriate adaptation. The reception quality reporting per subarea is done via standard mechanisms, such as the Real-time Transport Control Protocol, RTCP, which reports on a per subscriber level or any other mechanism, like for example collective reporting by the RNC. The intermediate node or the streaming server is the receiver of these reception quality reports. The stream to be adapted is determined from the stream identifier in a Real-time Transport Control Protocol RTCP report. Alternatively a subarea identifier can be included in the RTCP report, which is then used by the NIN or the server to adapt the corresponding stream.

In the following the establishment of a streaming session is described in more details. In particular the translation of the on-demand single-user signalling received from the streaming server into multi-user push signalling is discussed. The RTSP protocol is an example of an on-demand single-user signalling, because it is a client-server protocol, providing an interaction between two entities. The Session Initiation Protocol SIP is used as an example for a multi-user push signalling. SIP is a protocol, which provides functionality for performing actions initiated by the network without that the user requests it explicitly. Thus it is push-based protocol. Further the SIP provides the option for multicast addressing, it means a number of user can be requested with one message. Although the SIP protocol was developed for a point-to-point transmission, it supports multicast addressing. In the present invention it is used for multicast signalling.

Therefore SIP fulfils the requirements of a multi-user push signalling protocol. Further example for the a multi-user push signalling protocol is the combination of SIP and Session Description Protocol SDP, SIP/SDP, wherein the messages are SIP, but the stream description contained in the SIP messages is based on the SDP. Further the SIP/SDP messages can be replaced by corresponding Session Announcement Protocol SAP/SDP messages.

These protocols are merely examples for the multi-user push signalling and therefore they do not restrict the scope of the invention.

Figure 5:
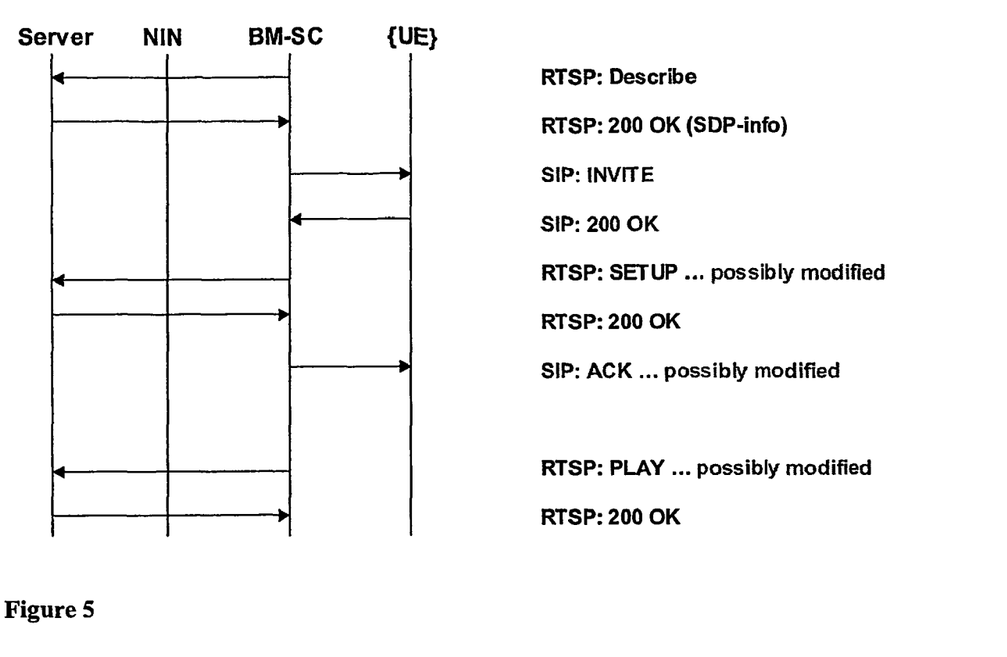
FIG. 5: signalling flow for multi-user streaming session establishment.

Multi-user streaming session establishment is described in respect to FIG. 5, which depicts the signalling flow between the Server, the NIN, the BM-SC and the members of a multicast group {UE}. At first the Server and the BM-SC are notified about a certain multicast service. The service notification can be realised by means of distribution of event-based messages from an operator, web-server or any other source to the BM-SC and the Server. With this solution the BM-SC is informed about servers offering multicast services. However there are different possibilities. Usually the info is available on web pages, distributed for example via e-mail or SAP messages. This information may be distributed by means of multicast or by means of papers to the operators administrating such information.

According to FIG. 5 in the first step the BM-SC requests a content description, by means of the RTSP: Describe message in order to see whether and how to handle the stream. Implicitly with this message the server is informed about the BM-SC as a streaming client for that particular session. It is necessary that the BM-SC knows the location of the Server, indicating only examples for receiving this information either the BM-SC has the addresses of the servers from the operator or this information is indicated by the user in corresponding Real-Time Transport Session Protocol RTSP message flows. The RTSP is a protocol responsible for establishment and for control of a session for point-to-point real-time applications, although it supports multicast addressing. The RTSP:DESCRIBE from the BM-SC to the streaming server can optionally includes the number of clients that this RTSP applies to in order to enable for example the proper charging of the mobile operator by the streaming service provider. The Server answers to the BM-SC with RTSP:200 OK (SDP-info), which is an acknowledgment specified in RTSP. This acknowledgment carries as parameters the Session Description Protocol information, SDP-info, like for example the required buffer size, the required transport bandwidth. According to this information the BM-SC establishes a multicast bearer for the certain multicast group when the streaming is about to start. In order to inform the users about incoming streaming session with the corresponding parameters a SIP: Invite message is sent. The users send the message SIP: 200 OK acknowledging the readiness for the streaming session. After that step a RTSP connection between the BM-SC and the Server by means of RTSP:SETUP and RTSP:200OK is established. It is also possible that the RTSP-Setup and RTSP:200 OK are exchanged before the transmission of the SIP message to the users. The RTSP:SETUP message can include parameters being changed according to performed negotiation and the Server answers with RTSP:200OK, whether he is able to accept a connection with the changed parameters. The changed parameters can be sent to the group members by means of a SIP:ACK message acknowledging to the group members the accepted changes and closing the streaming session establishment procedure. As next the transmission of the streaming flow is performed by means of a RTSP:Play message, receipt of which is acknowledged by means of a RTSP:200OK message.

It means the intermediate node acts like a single or multiple group members towards the streaming server, simulating one group member per GGSN, SGSN, RNC, or even cell. It is also possible to simulate a group member per QoS subgroup.

Towards the users it acts like a SIP server or remote client, inviting these users for a streaming session by translating the single user flows into multi-user flows. In the direction from the server to the users the intermediate node may interpret and modify the corresponding RTSP messages before propagating these as SIP messages. Modifications of messages can include the filtering of the SDP information according to the sub-network characteristics where the RTSP message and afterwards the RTP frames will be replicated. It means the BM-SC reduces QoS in SDP in case the access network is not able to handle the QoS or the operator does not allow such a QoS for that specific service. This is done by the generation of the RTSP:SETUP message. Further modification of the messages received from the Server can be that the BM-SC does not propagate the message, like for example the last RTSP: 200 OK in the sequence in FIG. 5 must not be propagated. Further the BM-SC is responsible for changing the unicast address to a multicast address in the corresponding messages in case this is required.

In the direction from the users to the server the intermediate node may modify the corresponding RTSP message content before sending it to the server. Modifications of messages can be for example the replication of the number of RTSP SETUP message and sending a SETUP message per multicast subgroup. In case a translation of addresses is required the BM-SC changes the multicast address to a unicast address.

In order to reduce the signalling for multi-user streaming sessions, and especially the number of messages sent on the radio interface, the signalling sequence can be optimized for multi-user streaming sessions in wireless networks. This optimization is depicted in FIG. 6.

Figure 6:
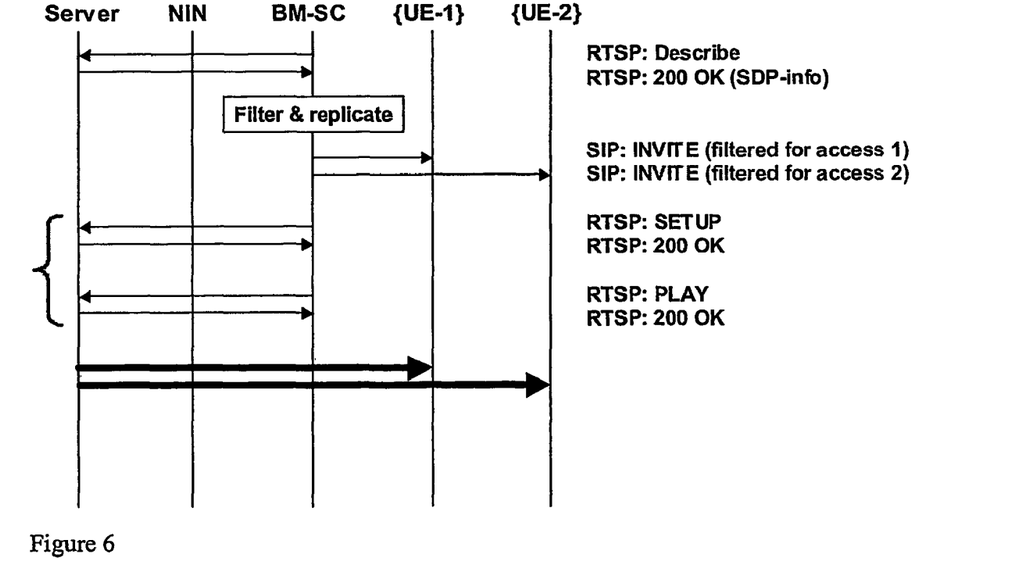
FIG. 6: signalling flow for multi-user streaming session with multiple subgroups.

In FIG. 6 the communication between a Server via the intermediate node to users being in two different access networks, {UE-1} and {UE-2}, is shown. The establishment of a bearer between the BM-SC and the group members according to the Server SDP-info is handled in a similar way as described in respect to FIG. 5. The difference is the filtering and the replication performed in the intermediate node before the first SIP:INVITE message is sent. As described before the BM-SC replicates the content and takes care of the necessary filtering of the SDP information and later the streamed content. The users indicate their interest in the service/content before or during registering to the multicast group and since the content is anyhow broadcasted on the air-interface, the actual service can be regarded as a push service in the sense that the users are just informed that the content will come by means of the SIP: INVITE message and then they wait for the arrival of the streaming flow. This message is either sent via unicast or broadcast/multicast to the users per area. It means users being in different access networks are distinguished, because according to the access network different Quality of Service requirements may have to be fulfilled.

This optimization reduces the signalling time delays and the number of messages to be sent on the radio interface. The users can be optionally informed about this optimization for multi-user streaming by means of an indication in the SIP INVITE message, which states that the next thing to be received is the actual streaming content. Optionally time or time period can be indicated to prepare the user for the reception of the streaming content.

Above the general idea was described without considering the order of performing the adaptation and replication of the streaming flow.

In the following the signalling exchange is described considering the order of the adaptation and replication of the streaming flow. This is to be distinguished by implementing the order of placing the BM-SC and the NIN within an intermediate node or in case the intermediate node has a decision unit for deciding about the way a streaming flow has to pass the corresponding entities within the intermediate node.

As mentioned above the BM-SC has information about the addresses of the servers. Further the BM-SC has also the addresses of the NINs, wherein the BM-SC either administrates the addresses or it has any other server discovery mechanism in order to be able to contact the NINs and link these into the path. In case of a network with multiple NINs having different capabilities, the BM-SC is aware of the capabilities either because they are administrated in the network or because NINs register to the BM-SC with their capabilities. These capabilities are used to select the appropriate NIN. This implies that different NINs can be selected by the BM-SC, for the adaptation of the streaming flow depending on the required capabilities. In the following some examples are given for capabilities to be considered. For example the available resources can be considered. Further the BM-SC distinguishes according to the adaptation speed, wherein the speed can depend on the used processors and/or on the reception quality reporting speed and/or the applied method. Further example is the supported wireless specific adaptation. This can be done on high level distinguishing between the different networks like for example GSM, WCDMA, WLAN, or more detailed by distinguishing the different specific parameters like the bandwidth, from 300 to 64 kbps, or the delay from 2 ms to 5 ms and corresponding buffering. Another example for distinguishing the NINs is the charging support, for example due to specific prepaid solutions based on different solutions like CAMEL, RADIUS, or DIAMETER. The available buffer size per stream indicating an overflow risk can be considered as a criterion for distinguishing the NINs. Further examples can be the supported wireless specific compression and security algorithms or the supported error protection mechanisms.

Figure 7:
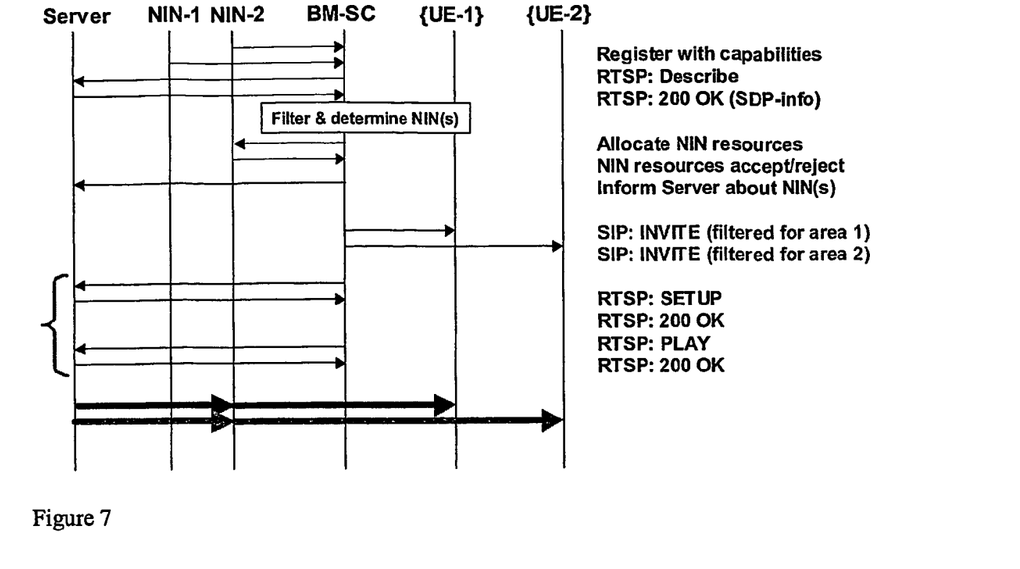
FIG. 7: signalling flow for multi-user streaming session with multiple NINs when NIN is located between a server and a BM-SC.

At first in respect to FIG. 7 the solution is described in which the streaming flow is forwarded at first through the NIN in order to adapt it accordingly and then through BM-SC for replication. The FIG. 7 includes two different NINs, NIN1 and NIN2 and two different subareas with multiple users {UE-1} and {UE-2}.

As described in respect to FIGS. 5 and 6 the BM-SC sends an RTSP: Describe to the server and receives the SDP-info. With that info it determines the NIN(s) to be allocated, taking into account the access networks or the subareas, where the users have registered, the capabilities of the different NINs and the selection criteria in the BM-SC. The BM-SC then allocates the corresponding resources in the NIN(s), like for example streaming adaptation resources may be reserved. This is beneficial in order to avoid that the resources are not available when the streaming session is starting. However, an operator may also decide not to reserve the resource but to take a small risk that the resources are not available later on. In the FIG. 7 only one NIN, NIN-2, is used for all streams. The BM-SC informs the server about the NINs, basically the NIN addresses are exchanged. This information may also be sent later in the SETUP or PLAY message. After that the SIP: invite messages are sent respectively for the different areas. The RTSP:SETUP and RTSP:PLAY messages are handled as described in respect to FIGS. 5 and 6. These may also be sent indirectly via the NIN in order for the NIN to be aware of the start of the stream. This may particularly be interesting for the RTSP:PLAY message.

The server sends two streams to NIN-2. Both are adapted according to the rules determined earlier and the streams are forwarded to the users in subarea-1 and subarea-2 respectively. Alternatively two or more different NINs could have been selected.

Figure 8:
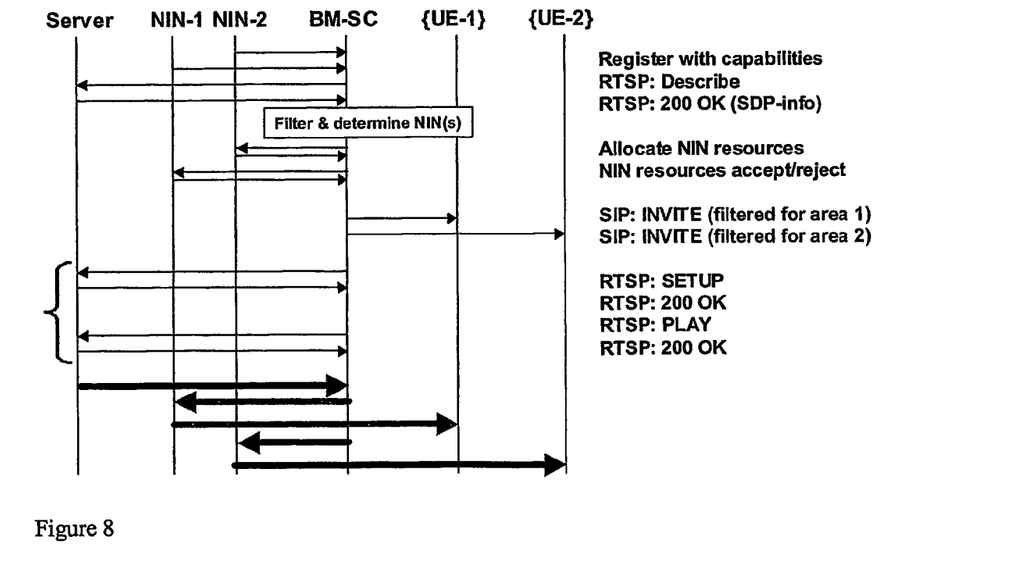
FIG. 8: signalling flow for multi-user streaming session with multiple NINs when a BM-SC is located between a server and the NINs.

In respect to FIG. 8 the situation is described, in which at first the streams are replicated before their adaptation is performed. The difference to FIG. 7 is that in FIG. 7 the replication is done in the server possibly ordered by the BM-SC, whereas in FIG. 8 the replication is done in the BM-SC.

As in the previous signalling sequences the BM-SC sends an RTSP:Describe to the server and receives the SDP-info. With that info it determines the NIN(S) to be allocated, taking into account the access networks or subareas where the users have registered, the capabilities of the different NINs and the selection criteria in the BM-SC. The BM-SC then allocates the corresponding resources in the NIN(s) and the corresponding SIP:INVITE messages for the respective subareas are sent. In the FIG. 8 two NINs are used for all streams. The RTSP:SETUP and RTSP:PLAY messages are handled as before.

The server sends a single stream to the BM-SC, which replicates this into two streams and forwards one stream to NIN-1 and the other to NIN-2. Both are adapted according to the rules determined earlier and the streams are forwarded to the users in subarea-1 and subarea-2 respectively. In case hierarchical coding is used, the streams to NIN-1 and NIN-2 may be different in the sense that a different number of layers are sent to each NIN, wherein the base layer is sent to both NINs and depending on the requirements a different number of the enhancement layers are sent to the different NINs.

With the present invention it is possible to perform a dedicated adaptation for areas covered by a GGSN, SGSN, RNC or NodeB, which means areas that are smaller than the coverage offered by a NIN or BM-SC. Furthermore, it is possible to do a dedicated adaptation per QoS subgroup, which may imply that more subgroups per geographical area, including a cell may exist. In order to realize it the nodes higher up in the hierarchy must be informed that the stream is only to be forwarded to a single node lower in the hierarchy. It means in case of a dedicated adaptation for an SGSN-area, the GGSN, BM-SC and NIN must be informed that the stream is only to be sent to that specific SGSN. As mentioned before the decision of dedicated adaptations is taken in the intermediate node. A new message is then to be distributed along the multicast delivery tree, indicating the stream and the destination for example a certain SGSN. All nodes in-between will set the distribution tree info accordingly for that specific stream.

It was mentioned for the NIN or the BM-SC to be aware of the available QoS in the corresponding subarea. This implies that the replication information must be accompanied by the addresses of the corresponding subarea or access nodes, such as the SGSN or the RNC. From these nodes the NIN or the BM-SC can then request the actual characteristics of the subarea in order to instruct the NIN adaptation logic accordingly.

In the following the replication of the multi-user streaming in the intermediate node or in the server upon request from the BM-SC is described in more details. The replication can be based on the different criteria. For example a replication is done to all members in a specific access network with specific access characteristics, like bandwidth it means one streaming flow goes to GSM users, one goes to UMTS users and one stream to users with WLAN access. The information about the access characteristic of the users is assumed to be available in the BM-SC or has to be included in the corresponding multicast group registration procedures. Another example is that the replication is performed to all members in a specific geographical area, served by a GGSN, SGSN, RNC or even each individual user. This kind of location information is also known to the BM-SC. This node has to know the NINs per port/link in case the replication is done to all users served by a specific NIN with a certain type or a certain version.

Basically, the BM-SC can replicate the same content in multiple streams with different characteristics. These streams can then get a dedicated and optimal treatment and adaptation in the NIN.

As described above once the session is established the payload can be streamed to the multi-user group. The initial replication is done by the server, which sends multiple different streams. The BM-SC acts as one or several group members towards the server and as a server towards the group members. Furthermore, it takes care of the necessary addressing adaptations.

In the following the charging and billing solution for the present invention is described. As already mentioned with the present invention an efficient solution is achieved for performing charging and billing for a multicast group receiving streaming flows.

The intermediate node coordinates the whole multi-user session and has all relevant information. Said node knows for example the users, the reception quality, the stream characteristics, the number of users per stream adaptation. All this information can be provided to the charging and billing servers in order to have a very accurate and fair charging policy applied. Since more accurate reception quality information is received by the NIN since it treats smaller subgroups, this information can be used to do a more accurate charging and billing for the multi-user service.

The described embodiments, in particular for UMTS should not be seen as a restriction for the present invention. Since this invention also applies to GPRS and can actually also be used in other wireless systems like for example WLAN together with a UMTS core network.

The invention claimed is:

1. A method in an intermediate node comprising a multicast/broadcast server and a streaming node for providing multicast for streaming transmission from a streaming server to users of a multicast group with the multicast/broadcast server providing multicast transmission and with the streaming node providing a streaming transmission based on an on-demand single-user signaling supporting the transmission of a streaming flow, the method comprising the steps of:

establishing a bearer for a multicast transmission according to the requirements for streaming transmission, establishing a multi-user streaming session on the bearer by translating the on-demand single-user signaling received from the streaming server into multi-user push signaling, adapting the received streaming flow to the multicast transmission according to the needs of the multicast group or subgroup of the multicast group; and replicating the received streaming transmission according to the number of the multicast subgroups.

2. The method according to claim 1 further comprising the step of the steaming node communicating with the server adapts the streaming transmission and forwards the adapted streaming transmission to the multicast/broadcast server, which replicates the received streaming transmission among subgroups of the multicast group.

3. The method according to claim 1 further comprising the step of the multicast/broadcast server communicating with the server replicates the received streaming transmission among the subgroups of the multicast group and forwards each replicated streaming transmission to the streaming node, which adapts each streaming transmission.

4. The method according to claim 3 wherein the streaming nodes have different capabilities and the multicast/broadcast server knows the different capabilities and addresses of the streaming nodes in order to select an appropriate streaming node for performing an appropriate adaptation of the streaming flow.

5. The method according to claim 4 wherein in case a hierarchical coding is used the streaming flows are differentiated in the sense that a different number of layers is sent to different streaming nodes.

6. The method according to claim 1 wherein a decision unit is provided for deciding how the received streaming flow is to be directed in the intermediate node.

7. The method according to claim 1, wherein the intermediate node administrates an address identifying the streaming flow arriving from the server.

8. The method according to claim 1, wherein the intermediate node receives a session description message informing about the transmission parameters required for the streaming session and forwards the received parameters to the group members by means of the multi-user push signaling message.

9. The method according to claim 1, wherein the intermediate node receives a session description message informing about the transmission parameters required for the streaming session and said intermediate node changes the received parameters according to the needs of the subgroups that receive a dedicated replicated stream and sends the changed parameter to the group members by means of the multi-user push signaling message.

10. The method according to claim 9 wherein nodes higher up in the hierarchy are informed that the streaming flow is only to be forwarded to a single node lower in the hierarchy by means of a new message being distributed along the multicast delivery tree.

11. The method according to claim 1 wherein the conversion between single-user on-demand and multi-user push signaling implies that certain messages are not propagated.

12. The method according to claim 1 wherein the replication of the streaming flow is based on an access network, in which users are located on the geographic area or on the Quality of Service the subgroup wishes for streaming sessions.

13. The method according to claim 12 wherein the intermediate node requests the actual characteristics of the area in order to adapt the streaming flow accordingly.

14. The method according to claim 1 wherein the intermediate node provides additional information to the charging/billing server in order to guarantee an accurate charging and/or multi-user streaming related charging.

15. An intermediate node being adapted to provide multicast for streaming transmission from a streaming server to group members of a multicast group with a multicast/broadcast server providing multicast transmission and with a streaming node providing a streaming transmission based on an on-demand single-user signaling supporting the transmission of a streaming flow wherein
said intermediate node comprises:
means for receiving the streaming transmission;
the multicast/broadcast server, which includes
bearer establishing means in multicast/broadcast server for establishing a bearer for a multicast transmission according to the requirements for streaming transmission received from the server,
session establishing means in the multicast/broadcast server for establishing a multi-user streaming session on the bearer by translating the on-demand single-user signaling received from the streaming server into multi-user push signaling;
the streaming node, which includes
adaptation means in the streaming node for adapting the received streaming flow to the multicast transmission according to the needs of the multicast group, and
replication means for replicating the received streaming transmission according to the number of the multicast subgroups.

16. A system being adapted to provide multicast for streaming transmission from a streaming server to group members of a multicast group with a multicast/broadcast server providing multicast transmission and with a streaming node providing a streaming transmission based on an on-demand single-user signaling supporting the transmission of a streaming flow, the system comprising an intermediate node for receiving the streaming transmission and:
establishing the bearer for the multicast transmission according to the requirements for streaming transmission,
establishing a multi-user streaming session on the bearer by translating the on-demand single-user signaling received from the streaming server into multi-user push signaling;
adapting the received streaming flow to the multicast transmission according to the needs of the multicast group or subgroup of the multicast group; and
replicating the received streaming transmission according to the number of the multicast subgroups.

* * * * *